United States Patent Office 2,886,601
Patented May 12, 1959

2,886,601

STABILISATION OF PHENOLS BY DIAMINES

Harry Clough, Norton-on-Tees, England, assignor to Imperial Chemical Industries Limited, Millbank, London, England, a corporation of Great Britain No Drawing. Application June 27, 1957
Serial No. 668,310

Claims priority, application Great Britain
July 6, 1956

5 Claims. (Cl. 260—620)

This invention relates to the stabilisation of phenols. Many phenols are susceptible to oxidation, by for example exposure to the atmosphere, which can cause the formation of objectionable odour and colour. We have found that this process can be inhibited by treating the phenol with a stabilising compound as hereinafter defined.

According to the present invention therefore, there is provided a composition of matter which comprises at least one phenol which is susceptible to atmospheric oxidation resulting in discoloration and/or objectionable odour, and a small amount as hereinafter defined of a stabilising compound having the structure:

$$A—X—B$$

in which X is an aliphatic, alicyclic or aromatic radical, and A and B are radicals having the structure $$-N{=}C{\diagup}^{R_1}_{\diagdown R_2}$$

or $$-N{\diagup}^{R_1}_{\diagdown R_2}$$

in which $R_1$ and $R_2$ are hydrogen, alkyl, alicyclic or aryl radicals, with the exception that in the case in which X is an aliphatic radical A and B shall not both have the structure $$-N{=}C{\diagup}^{H}_{\diagdown R_2}$$

where $R_2$ is an aromatic nucleus having a hydroxyl group attached to the nucleus in a position adjacent to the $-CH{=}N-$ group.

Also according to the present invention there is provided a process for the stabilisation of a phenol of the kind described in which the said phenol is treated with a stabilising compound as hereinbefore defined.

By the term "small amount," I mean, in this specification, an amount which is at most approximately 5% by weight of the phenol, a suitable small amount being between approximately 0.01% and 2% by weight of the said phenol.

Where the radical X in the stabilising compounds of this invention is an aliphatic radical, it is preferably a saturated aliphatic radical such as the ethylene radical $-CH_2-CH_2-$. Examples of this preferred type of stabilising compound include ethylene diamine $$NH_2CH_2CH_2NH_2$$

and beta-hydroxy ethyl ethylene diamine $$NH_2CH_2CH_2NHCH_2CH_2OH$$

The radical X may also be an aryl radical, as in disalicylidine orthophenylene diamine.

The radicals A and B may be different, or they may be identical radicals. The radicals $R_1$ and $R_2$ may also be different or identical. In those cases where the radicals A and B are of the type $$-N{=}C{\diagup}^{R_1}_{\diagdown R_2}$$

the stabilising compound may be obtained as a result of condensation between a primary amine and an aldehyde, ketone, or derivative thereof.

Stabilising compounds according to the present invention, in which the radicals A and B are of the type $$-N{\diagup}^{H}_{\diagdown R_1}$$

may be obtained by reducing a condensation product of the kind described.

Phenols which may be stabilised according to the present invention include for example phenol, phenylphenols, cresols, xylenols and their further alkylated products.

It is a feature of the present invention that the phenol may be treated with the stabilising compound at any convenient stage in the course of the manufacture of the phenol, for example during its crystallisation, or during a washing process applied to the phenol. It is convenient to add a stabilising compound in the form of an aqueous alcoholic solution.

The following example illustrates the application of the present invention to the stabilisation of 4-methyl-2,6-di-tert.-butylphenol.

EXAMPLE

In each test 270 grams of the crude liquid phenol were mixed with 510 mls. of methanol and precipitated at 15° C. with 90 mls. of water, with constant stirring. Where indicated, a stabilising compound was added according to the invention to the methanol solution of the crude

*Table 1.—Stabilisation of 4-methyl-2,6-di-tert.-butylphenol*

| Phenol Batch No. | Additive | Additive Concn., percent | Initial | Colour After 3 weeks | |
|---|---|---|---|---|---|
| | | | | At 50° C. | At room temp. |
| 1 | Nil | | 2.7 | 13.4 | 3.4 |
| | Dibenzylidene ethylenediamine. | 0.375 | 1.6 | 3.0 | 1.9 |
| | Nil | | 2.5 | 15.7 | 5.4 |
| | Disalicylidene paraphenylenediamine. | 0.0525 | 2.1 | 8.9 | 3.1 |
| | Beta-hydroxyethyl-ethylenediamine. | 0.375 | 3.4 | 8.8 | 3.6 |
| 2 | Disalicylidene orthophenylenediamine. | 0.165 | 2.1 | 2.0 | 2.1 |
| | 1:2-bis (2-hydroxy-benzylamino) ethane. | 0.375 | 1.5 | 2.1 | 2.6 |
| 3 | Nil | | 1.6 | 24.3 | |
| | Ethylenediamine | 0.35 | 1.5 | 5.3 | |
| | | | | After 3 weeks at 50° C. | After 6 weeks at room temp. |
| | Nil | | 2.5 | 51.1 | 36.4 |
| | Di-para-hydroxy-benzylidene ethylenediamine. | 0.35 | 3.5 | 4.5 | 6.2 |
| 4 | Di-isobutylidene-ethylenediamine. | 0.35 | 3.1 | 36.3 | 5.9 |
| | 1:5-diaminopentane. | 0.35 | 2.6 | 25.6 | 12.2 | phenol. The precipitate, which was predominantly 4-methyl - 2,6 - di - tert. - butylphenol, was separated from mother liquor in a centrifuge, dried and stored in the dark in porcelain dishes covered by clock glasses, either at 50° C. or at room temperature, as indicated. The colour of each sample was determined as follows:

A 1" Lovibond cell was filled with a molten sample, and the colour was determined, using red and yellow slides, from the formula:

$$C = Y + 3R$$

where C = colour of sample, and Y and R are respectively the yellow and red colour units required to match the sample. (See "Standard Methods of Testing Tar and its Products" published by the Standardisation of Tar Products Tests Committee, London, 3rd edition, 1950, page 214.) The results of the tests carried out in the example are given as weight percentage of precipitated phenol.

I claim:

1. A composition of matter consisting essentially of at least one air-oxidizable phenol in combination with a small amount of a stabilizing compound having the structure:

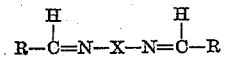

wherein X is selected from the group consisting of divalent alkylene radicals and divalent phenylene radicals and R is selected from the group consisting of lower alkyl, phenyl, and hydroxyphenyl, provided that when X is lower alkylene, R is not in each instance ortho-hydroxyphenyl.

2. A composition according to claim 1, in which the stabilizing compound is present to the extent of between 0.01% and 2% by weight of the phenol.

3. A composition according to claim 1, in which the phenol is a monohydric phenol.

4. A composition according to claim 1, in which the phenol contains a mono-nuclear phenolic group.

5. A composition according to claim 1, in which the phenol is selected from the group consisting of phenol, cresols, xylenols, phenyl phenols, and 4-methyl-2:6-di-tert.-butylphenol.

References Cited in the file of this patent

UNITED STATES PATENTS

| | | |
|---|---|---|
| 1,942,838 | Semon | Jan. 9, 1934 |
| 2,130,322 | Kharasch | Sept. 13, 1938 |
| 2,570,403 | Stevens et al. | Oct. 9, 1951 |

FOREIGN PATENTS

| | | |
|---|---|---|
| 670,502 | Great Britain | Apr. 23, 1952 |